(12) United States Patent
Saito

(10) Patent No.: US 7,657,369 B2
(45) Date of Patent: Feb. 2, 2010

(54) NAVIGATION DEVICE FOR A VEHICLE, METHOD FOR PRODUCING DATA FOR A SEARCH, AND METHOD FOR SEARCHING FOR A GUIDED ROUTE

(75) Inventor: Noriyuki Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 289 days.

(21) Appl. No.: 11/832,388

(22) Filed: Aug. 1, 2007

(65) Prior Publication Data

US 2008/0077318 A1    Mar. 27, 2008

(30) Foreign Application Priority Data

Sep. 25, 2006   (JP)   ............... 2006-259314

(51) Int. Cl.
G01C 21/00   (2006.01)
(52) U.S. Cl. ..................... 701/201; 340/990
(58) Field of Classification Search ............ 701/201; 340/990
See application file for complete search history.

(56) References Cited

U.S. PATENT DOCUMENTS

| 4,914,605 A | 4/1990 | Loughmiller, Jr. | |
| 6,072,409 A * | 6/2000 | Fushimi et al. | 340/995.19 |
| 6,424,911 B2 * | 7/2002 | Yamashita et al. | 701/208 |
| 6,771,189 B2 * | 8/2004 | Yokota | 340/990 |
| 6,950,744 B2 * | 9/2005 | Daizen | 701/209 |
| 2001/0012981 A1 * | 8/2001 | Yamashita et al. | 701/211 |

FOREIGN PATENT DOCUMENTS

EP    1406064 A1    9/2003

* cited by examiner

Primary Examiner—Mark Hellner
(74) Attorney, Agent, or Firm—Brinks Hofer Gilson & Lione

(57) ABSTRACT

Navigation devices for vehicles, methods for producing data for searches, and methods for searching for guided routes are disclosed. Generally, a name of a first street is received, a search for second streets which are connected to an end point of the first street directly or via road links is performed, the second streets are displayed, a selection is received of one of the displayed second streets, and a branch point or an area at which the first street and the selected second street are connected with each other is stored as data for a search relating to the first street.

20 Claims, 14 Drawing Sheets

NAVIGATION DEVICE FOR A VEHICLE, METHOD FOR PRODUCING DATA FOR A SEARCH, AND METHOD FOR SEARCHING FOR A GUIDED ROUTE

RELATED APPLICATIONS

The present application claims priority to Japanese Patent Application Serial Number 2006-259314, filed Sep. 25, 2006, the entirety of which is hereby incorporated by reference.

BACKGROUND OF THE INVENTION

1. Field of the Invention

The present invention relates to a navigation device for a vehicle, a method for producing data for a search, and a method for searching for a guided route. More specifically, the present invention relates to a navigation device for a vehicle, a method for producing data for a search, and a method for searching for a guided route that displays the guided route and guides a driver to a destination.

2. Description of the Prior Art

Typical navigation devices for vehicles display a position of a vehicle, and a guided route for use in guiding the vehicle to a destination on map data.

In order to provide these functions, the navigation device generally defines a branch point of a road as a node, and defines a road connecting nodes as a road link. The navigation device stores a set of nodes and road links as map data.

The navigation device additionally identifies an intersection of various branch roads in the map data, also referred to as a crossroad, by adding an attribute representing the crossroad to nodes. Further, according to Japanese Laid-Open Patent Publication (Kokai) No. 2004-117268, the navigating device may identify a roundabout by adding an attribute representing a roundabout to nodes and road links in the map data.

A position of a vehicle is shown on a road map based on various data, such as the map data described above. A driver may input multiple names of roads from input means, and the navigation device may search for the nodes and road links constituting these multiple roads that were input by the driver based on the map data. Then, the navigation device may search for a node at which multiple roads join, and which has the attribute of a crossroad or a roundabout as a destination or a via-point that the vehicle travels through. Further, a map including the searched point may be displayed to the driver for guiding to the vehicle to the destination.

However, in reality, criterion for defining a branch road as a crossroad or a roundabout depends on map companies, which may not define the a crossroad or a roundabout in the same way. For example, map companies may not consistently define a case where two T-intersections are located adjacent to each other, and are connected by another road, referred to as a dogleg branch road hereinafter; a case of a roundabout with a diameter equal to or less than 25 m; a case of a roundabout which is not one-way; a case of a roundabout to which another link such as a road or a railroad is connected in the middle thereof; or a case of a roundabout which includes a traffic light. As a result, these cases cannot be shown as destinations or via-points.

Moreover, even if multiple names of roads are entered, when these roads do not include crossroads and roundabouts, the search fails, and a map including the multiple roads and surrounding areas thereof is not shown. However, even if multiple roads are not connected with other, when a driver heads in the same direction to which he or she wants to go, it is possible to take the same road to reach a neighborhood of a final destination.

These problems prevent providing finer route guidance.

SUMMARY OF THE INVENTION

The present invention is devised in view of the foregoing problems of the prior art, and provides a navigation device for a vehicle, a method for producing data for a search, and a method for searching for a guided route which can search for a branch point or an area where multiple roads join, or an area where multiple roads are adjacent to each other as a destination or a via-point without the branch point or area being classifying as a crossroad, a roundabout, or an intersection, thereby providing a finer route guidance.

Accordingly, one aspect of the present invention provides a method for producing data for a search on a navigation device for a vehicle for a route search based on map data where a road is represented as a set of nodes and road links, and a set of specific nodes and road links are defined as a specific street. The method includes a step of receiving a name of a first street, a step of searching for second streets which are connected directly or via a road link to an end point of the first street, a step of selecting one of the searched second streets, and a step of storing a branch point or an area at which the first street and the selected second street are connected with each other as data for search relating to the first street.

According to a method for producing data for a search, a navigation device for a vehicle carrying out a route search based on the map data first receives the name of a first street, and searches for second streets connected directly or via a road link to the node of the end point of the first street. On the map data, a set of specific nodes and road links is defined as a specific street. As a result, it is possible by entering a name of the first street to identify nodes constituting the first street, and to identify road links connected to these nodes. Moreover, it is thus possible to search for second streets connected to the road links. In this case, the number of the second streets connected directly or via road links to the node of the end point of the first street is not always one.

Therefore, the navigation device for a vehicle selects one of the searched second streets, and further stores a branch point or an area at which the first street and the selected second street are connected with each other as data for a search relating to the first street.

In this way, it is possible to easily produce data for search by entering a name of a first street, and selecting one of the searched second streets. Moreover, it is possible to produce the data for a search in advance, and it is also possible to produce the data for a search during the search since the route search with the same method enables a result of the route search to be used as data for a search. During the route search, a map of a branch point or an area is shown based on a result of the route search, and the result of the search is also stored as data for search.

Based on the data for a search produced in this way, it is possible to search for a crossroad or a roundabout, which is conventionally specified in advance by an identification flag for a node, without the identification in advance. Conversely, it is possible to search for a T-intersection, a dogleg branch road including two T-intersections adjacent to each other, a branch road which is similar to a roundabout, but is not circularly connected, and other branch roads, although they cannot be traditionally searched for since they are not specified by an identification flag for a node.

As described above, according to a method for producing data for a search, even if an attribute is not assigned to a branch point or an area in map data in advance, it is possible to search for the branch point or the area as a destination or a via-point where a first street and a second street are connected with each other by entering a name of the first street and selecting the second street.

Another method for producing data for a search according to one aspect of the present invention includes searches for at least one second street which is not connected, but is adjacent to a first street instead of searching for second streets which are connected directly, or via road links, to an end point of the first street. Moreover, a second street, selected from the searched second streets and the entered first street, are associated with each other, and are stored as data for a search.

Also, in this case, as in the case of searching for second streets connected to a first street, it is possible to produce data for a search which is a first street and a second street associated with each other by entering a name of the first street and selecting one of second streets adjacent thereto. Moreover, the data for search can also be produced in advance or during the route search.

Moreover, another aspect of the present invention provides a method for searching for a guided route on a navigation device for a vehicle based on map data where a road is represented as a set of nodes and road links, and a set of specific nodes and road links is defined as a specific street. The method may include a step of receiving a name of a first street, a step of searching for second streets which are connected directly or via a road link to an end point of the first street, a step of selecting one of the searched second streets, and a step of showing a map of a branch point or an area at which the first street and the selected second street are connected with each other.

According to a method for searching for a guided route, even if an identification flag for indicating a type of a branch point or an area is not set to nodes constituting the branch point or the area in a general map data, it is possible by entering a name of a first street and selecting one of the searched second streets to search for a branch point or an area at which the first street and the selected second street are connected with each other. The branch point and the area include a crossroad and a roundabout, as well as a T-intersection, a dogleg branch road including two T-intersections adjacent to each other, and a branch road which is similar to a roundabout, but the road is not circularly connected.

Moreover, another method for searching for a guided route includes searching for at least one second street which is not connected, but is adjacent to, a first street instead of searching for second streets which are connected directly or via road links to an end point of the first street as described above. Moreover, this method shows a map of an area where the selected second street is adjacent to the entered first street.

Also in this case, as in the case of searching for second streets connected directly or via road links to a node of an end point of a first street, it is possible by entering a name of a first street and selecting one of second streets which is not connected, but is adjacent to, the first street to easily search for and show an area where the first street and the second street are adjacent to each other as a destination or the like.

Moreover, still another aspect of the present invention provides a navigation device for a vehicle for showing and guiding a guided route to a destination. The navigation device includes storage means for map data where a road is represented as a set of nodes and road links, and a set of specific nodes and road links is defined as a specific street; input means that receives a name of a first street; search data storage means that stores data for a search relating to the first street; display means that shows guide information; and control means that is connected to the input means, the storage means for map data, the search data storage means, and the display means. If the name of a first street is entered, the control means searches for, and shows second streets which are connected directly, or via road links, to an end point of the first street. Then, if one of the shown second streets is selected, the control means shows a map of a branch point or an area at which the first street and the selected second street are connected with each other, and stores the branch point or the area at which the first street and the selected second street are connected with each other in the search data storage means as data for a search relating to the first street.

With the above-described navigation device, the control means, based on a method for searching for a guided route, searches for a branch point or an area at which the entered first street and the selected second street are connected with each other. The control means then shows a map thereof, and stores the branch point or the area as data for a search relating to the first street in the search data storage means. In other words, it is possible to produce data for a search including a branch point or an area at which the first street and the second street are connected with each other during the route search.

With respect to another navigation device for a vehicle, if a name of a first street is entered, the control means searches the search data storage means for a second street which is connected directly or via a road link to an end point of the first street. The control means then shows a map of a branch point or an area at which the first street and the searched second street are connected with each other.

In other words, it is possible to produce data for a search for a branch point or an area at which a first street and a second street are connected with each other in advance, to store the data for a search in the search data storage means, to read out the data for the search when the name of the first street is entered during the route search, and to show a map of the branch point or the area.

With respect to still another navigation device for a vehicle, if a name of a first street is entered, the control means, based on the map data, searches for and shows at least one second street which is not connected, but is adjacent to, the first street. If one of the shown second streets is selected, the control means then shows a map of an area at which the first street and the selected second street are adjacent to each other, and stores the area at which the first street and the selected second street are adjacent to each other as data for a search relating to the first street.

In other words, the control means, based on a search method for a guided route, searches for an area at which the first street and the selected second street are adjacent to each other. The control means then shows a map thereof, and stores the area at which the first street and the selected second street are adjacent to each other in the search data storage means as data for a search relating to the first street. In this way, it is possible to produce data for a search including an area at which the first street and the second street are adjacent to each other during the route search.

On yet another navigation device for a vehicle, if a name of a first street is entered, the control means searches the search data storage means for at least one second street which is not connected, but is adjacent to, the first street, and shows a map of an area at which the first street and the searched second street are adjacent to each other.

In other words, it is possible to produce data for a search including an area at which a first street and a second street are adjacent to each other in advance, to store the data for the search in the search data storage means, to read out the data for the search when a name of the first street is entered during the route search, and to show a map of the area at which the first street and the second street are adjacent to each other.

As described above, a method for producing data for a search includes receiving a name of a first street, searching for second streets connected or adjacent to the first street, selecting one of the searched second streets, and storing a branch point or an area at which the first street and the select second street are connected with each other, or an area at which the first street and the selected second street are adjacent to each other as data for a search relating to the first street.

By means of the data for search, it is possible to search for a crossroad, a roundabout, and an intersection which does not belong to these categories as a destination, or a via-point, even if nodes and the like constituting them do not include an attribute identifying them.

Moreover, the method for searching for a guided route, as the method for producing data for search, may include receiving a name of a first street, searching for second streets connected to the first street, selecting one of the searched second streets, identifying a branch point or an area at which the first street and the second street are connected with each other, and showing a map thereof. Alternatively, the method may including receiving a name of a first street, searching for second streets adjacent thereto, selecting one of the searched second streets, identifying an area at which the first street and the second street are adjacent to each other, and showing a map thereof.

Therefore, it is possible to search for a crossroad, a roundabout, or an intersection which does not belong to these categories as a destination or a via-point even if nodes and the like constituting them do not include an attribute identifying them, thereby providing even finer route guidance.

Moreover, a navigation device for a vehicle includes search data storage means which store data for a search relating to a first street produced by a method for producing data for a search.

It is thus possible to produce and store data for a search relating to the first street in advance of, or during route guidance. As a result, it is possible to search for a crossroad, a roundabout, and an intersection which does not belong to these categories as a destination or a via-point even if nodes and the like constituting them do not include an attribute identifying them, thereby providing even finer route guidance.

BRIEF DESCRIPTION OF THE DRAWINGS

FIGS. 2 to 4 are flowcharts showing one embodiment of a method for producing data for a search on a navigation device for a vehicle, in which:

FIG. 2 shows a first part of the method;
FIG. 3 shows a second part of the method; and
FIG. 4 shows a third part of the method;

DESCRIPTION OF THE PREFERRED EMBODIMENTS

Configuration of a Navigation Device for a Vehicle

Figure 1:
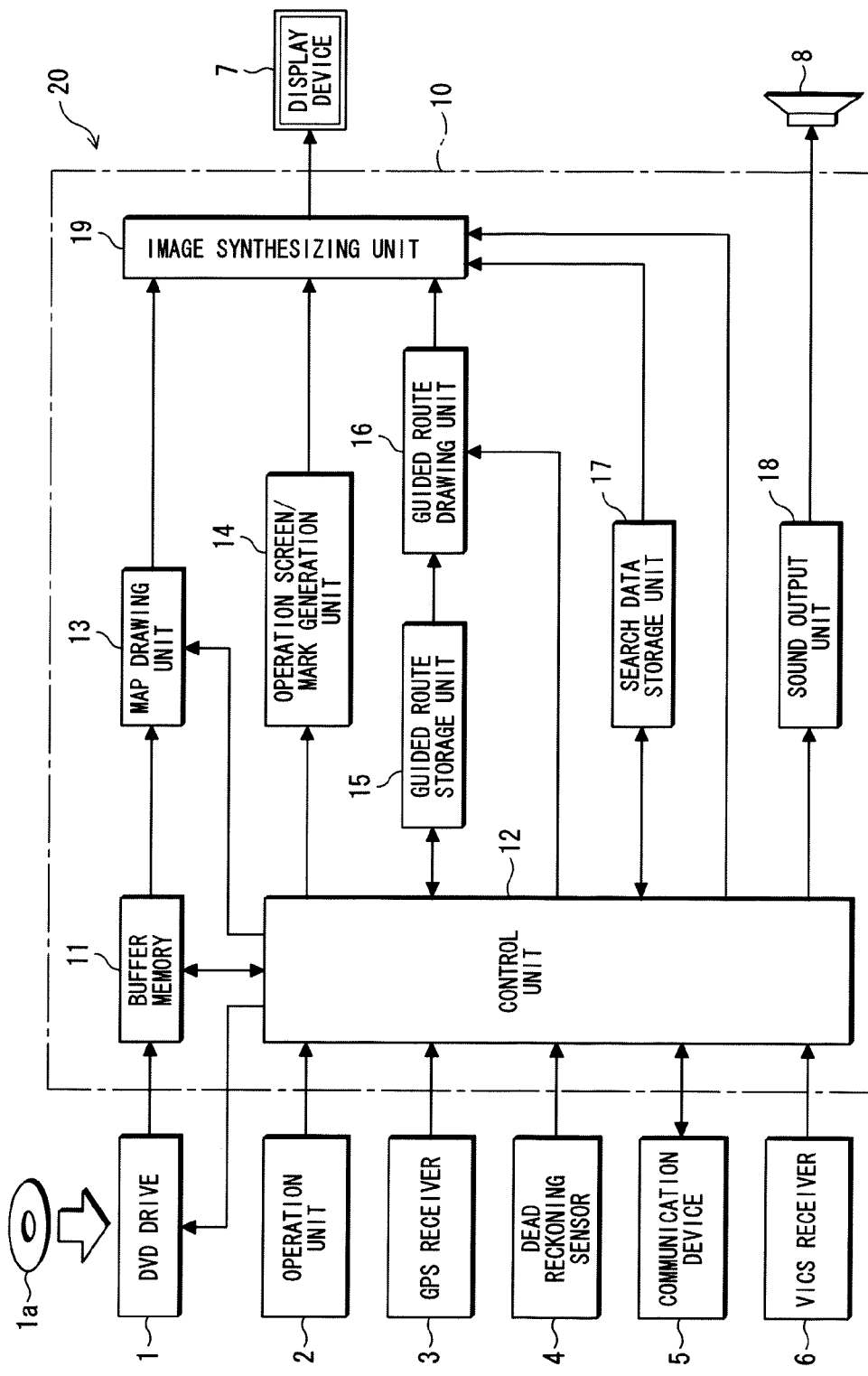
FIG. 1 is a block diagram showing one embodiment of a configuration of a navigation device for a vehicle.

FIG. 1 is an illustration of one embodiment of a configuration of a navigation device for a vehicle. In a navigation device 20 for a vehicle, reference numeral 1 denotes a DVD-ROM drive. A DVD-ROM 1a driven by the DVD-ROM drive 1 stores map data that may be partitioned by longitudinal intervals and latitudinal intervals according to a scale, such as $1/12500$, $1/25000$, and $1/50000$, in advance. This map data is represented by a coordinate set of points, also known as nodes, that represent a longitude and a latitude. The node represents a branch point of a road, and a road portion connecting two nodes with each other is referred to as a road link. A road is represented as a set of nodes and road links, and a set of specific nodes and road links is defined as a specific street.

The map data may include a road layer for map matching and route search, a background layer for showing various objects such as roads, parks, rivers, landmark buildings, facilities and so on, on a map diagram, and a character/sign layer for showing characters such as administrative district names such as names of cities, towns, and villages, road names (street names), building names, map signs, and the like. It should be noted that intersection names and roundabout names may be added on the character/sign layer, if necessary.

The road layer of the various layers constituting the map data mainly relates to the present invention. Though a data structure of the road layer is not specifically illustrated, various lists contained in the road layer may include a road list and a node table. The road list is constituted by data such as a type of a road, a total number of nodes constituting the road, a position of a node on the node table, and a road width to a next node of the nodes constituting the road for respective roads (streets). The node table is a list of all the nodes on the map, and is constituted by position information (longitude and latitude), a pointer indicating the position of a road to which the node belongs on the road list, and the like for the respective nodes.

If the lists as described above are provided as the various lists contained in the road layer, objects of the present invention such as production of data for search and route search can be attained, and an intersection constituting node list, an intersection net list, a roundabout constituting node list, a roundabout net list, and the like may further be added as the various lists contained in the road layer for search by a conventional method. Further, in this case, identification flags may be added to the node table, such as a crossroad identification flag indicating whether a node is a crossroad, a pointer indicating a position in an intersection constituting node list is a crossroad, a T-intersection identification flag indicating whether the node is a T-intersection, a roundabout identification flag indicating whether the node is a roundabout, and a pointer indicating a position in a roundabout constituting node list is a roundabout.

The intersection constituting node list and the roundabout constituting node list, respectively, may include a set of positions on the node table of nodes (intersection constituting nodes and roundabout constituting nodes) of links (roads) connected to respective crossroads and roundabouts on the map. Moreover, an intersection net list and a roundabout net list may include data such as ID information identifying respective nodes constituting a crossroad and a roundabout, the number of nodes constituting the crossroad and the roundabout, a sequential number of a next crossroad or a next roundabout, the distance, a road attribute (road type and road width) to the next crossroad or the next roundabout, and the like.

Reference numeral 2 denotes an operation unit used to operate a navigation device main unit 10, described in more detail below. In one implementation, the operation unit 2 is a remote control transmitter. The remote control transmitter is properly provided with various operation buttons, a joystick, and the like, which is not specifically illustrated, in order to select various menus, various items, and the like, on a screen of a display device, described in more detail below, and to execute a selected menu or the like.

Reference numeral 3 denotes a GPS receiver that detects the longitude and latitude of a vehicle based on received GPS signals transmitted from GPS satellites. Reference numeral 4 denotes a dead reckoning sensor. The dead reckoning sensor 4 may include an angle sensor, such as a gyro, for detecting a travel direction of a vehicle, and a distance sensor, which generates a pulse each time a vehicle travels a specific distance, and is used to detect a travel speed of a vehicle.

Reference numeral 5 denotes a communication device, such as an onboard telephone, for communicating with various service centers. Reference numeral 6 denotes a VICS (Vehicle Information and Communication System) receiver that receives VICS information transmitted from radio wave beacons and optical beacons.

Reference numeral 7 denotes a display device, such as an LCD. The display device 7 provides a user, especially a driver, with guide information for navigation (such as the present position of the own vehicle (vehicle position mark), a map of a neighborhood of a vehicle, a guided route from a start to a destination, and other guide information) on the screen based on control by the navigation device main unit 10. Further, the display device 7 shows information on an arithmetic operation and a display process carried out by the navigation device 20 on the screen, as described in more detail below.

Reference numeral 8 denotes a speaker that provides a user with guide information for navigation by means of sound based on control by the navigation device main unit 10, as described in more detail below.

Reference numeral 11 denotes a buffer memory which temporarily stores map data read out from the DVD-ROM 1a via the DVD-ROM drive 1 in the navigation device main unit 10.

Reference numeral 12 denotes a control unit constituted by a microcomputer or the like. The control unit 12 stores a navigation program for processing a route search, for controlling the display for route guidance based thereon. The control unit 12 additionally detects a present position of a vehicle based on a signal output from the GPS receiver 3; calculates a travel speed, also known as vehicle speed, of the vehicle based on a signal output from the dead reckoning sensor 4; reads out data of a map to be shown from the DVD-ROM 1a via the DVD-ROM drive 1 in the buffer memory 11; and searches for a guided route from a start position, or present position, of the vehicle, to a destination under search conditions set by means of the map data read out to the buffer memory 11 based on the program. Moreover, the control unit 12 may include functions for controlling arithmetic operations and a display process carried out by the navigation device 20, as described in more detail below.

Reference numeral 13 denotes a map drawing unit which carries out a drawing process of a map image based on map data read into the buffer memory 11. Reference numeral 14 denotes an operation screen/mark generation unit that generates various menu screens (operation screens) and various marks, such as a vehicle position mark, and a cursor according to operation conditions. Reference numeral 15 denotes a guided route storage unit that stores data relating to a guided route. This guided route storage unit 15 stores data relating to all nodes, which are coordinates represented in the longitude and latitude, constituting a road from a start to a destination of a guided route searched for by the control unit 12. Reference numeral 16 denotes a guided route drawing unit that reads out the data of the guided route from the guided route storage unit 15, and draws the guided route in a display manner different from the other roads (in a different color or different line width, for example).

Reference numeral 17 denotes a search data storage unit that stores data for a search produced in advance of, or during the route search. The data for the search is a first street entered by a driver, a second street selected by the driver from at least one second street, which is searched for based on map data, and is connected to an end point (node) of the first street in a travel direction of the vehicle, and a branch point or an area at which the first street and the second street are connected with each other directly or via road links associated by the end point (node) of the first street, the road links, a start point (node) of the second street, and the like. Alternatively, the data for search may be a first street entered by the driver, a second street selected by the driver, and an area at which the first street and the second street, which are not connected with each other, are adjacent to each other, are associated by an area at which the first street and the second street are most adjacent to each other, and the most adjacent distance.

Figure 11A:
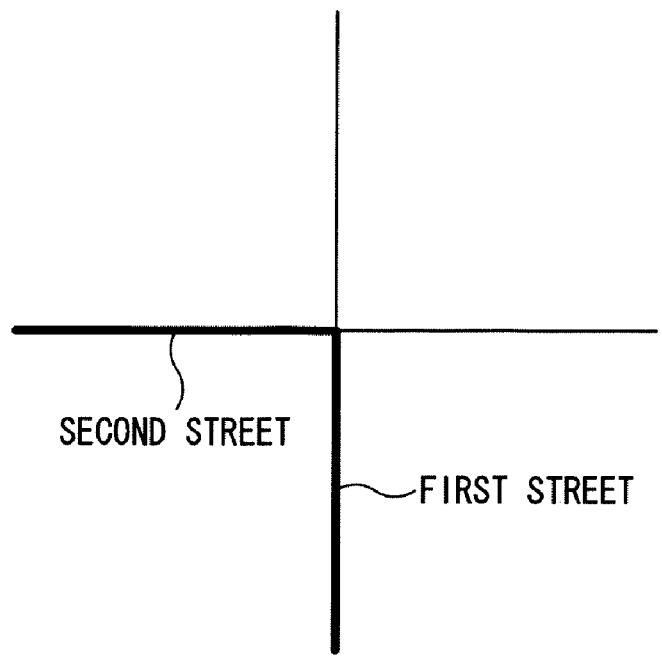
FIGS. 11(a) and 11(b) are first diagrams showing a destination or a via point set as data for a search by a method for producing data for a search on a navigation device for a vehicle.
Figure 11B:
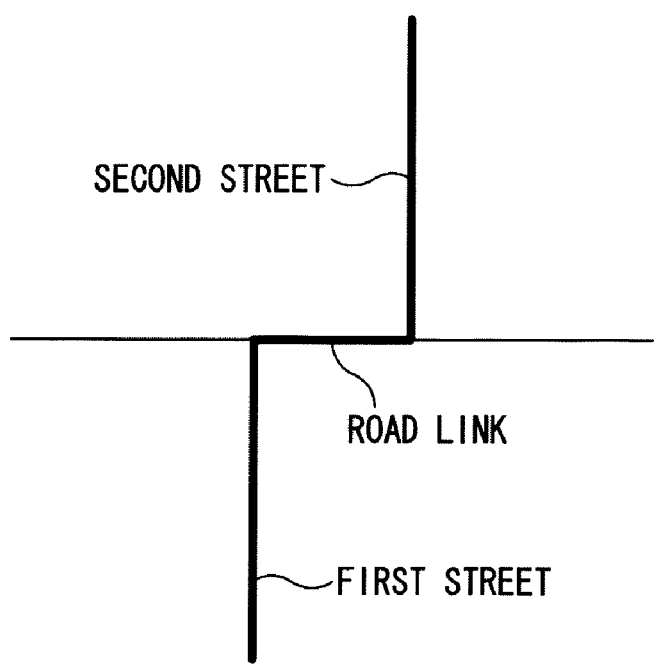
Figure 12A:
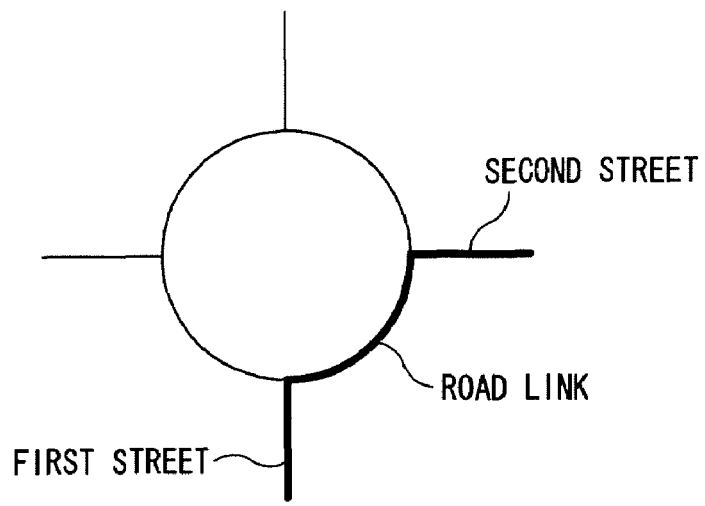
FIGS. 12(a) and 12(b) are second diagrams showing a destination or a via-point set as data for a search by a method for producing data for search on a navigation device for a vehicle.
Figure 12B:
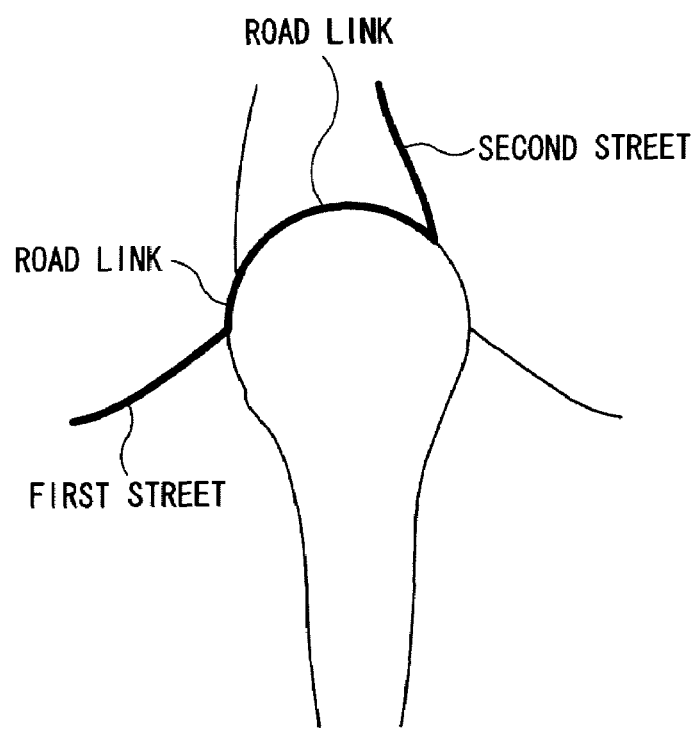
Figure 13:
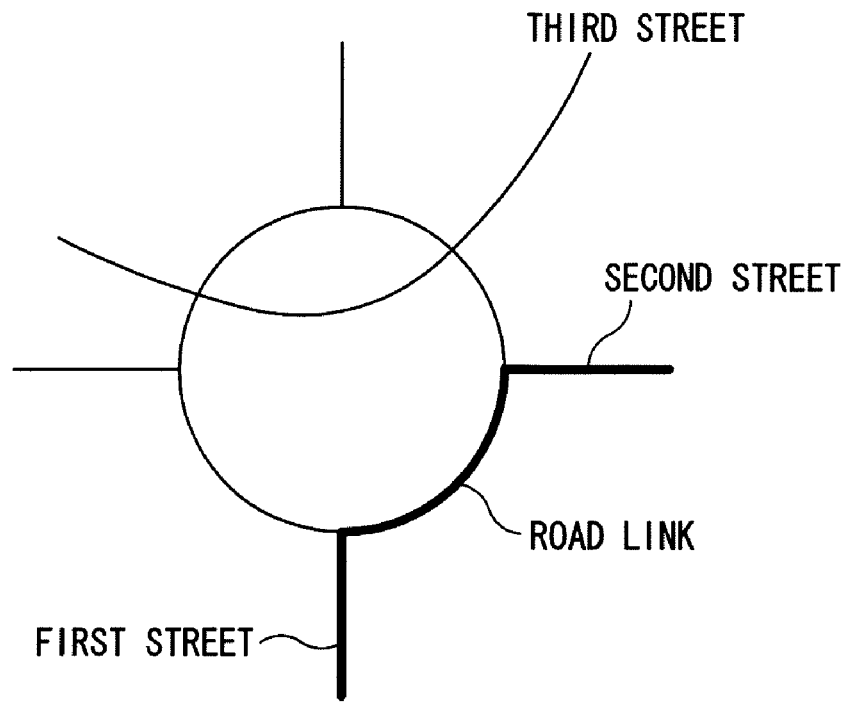
FIGS. 13(a) and 13(b) are third diagrams showing a destination or a via-point set as data for a search by a method for producing data for a search on a navigation device for a vehicle.
Figure 13:
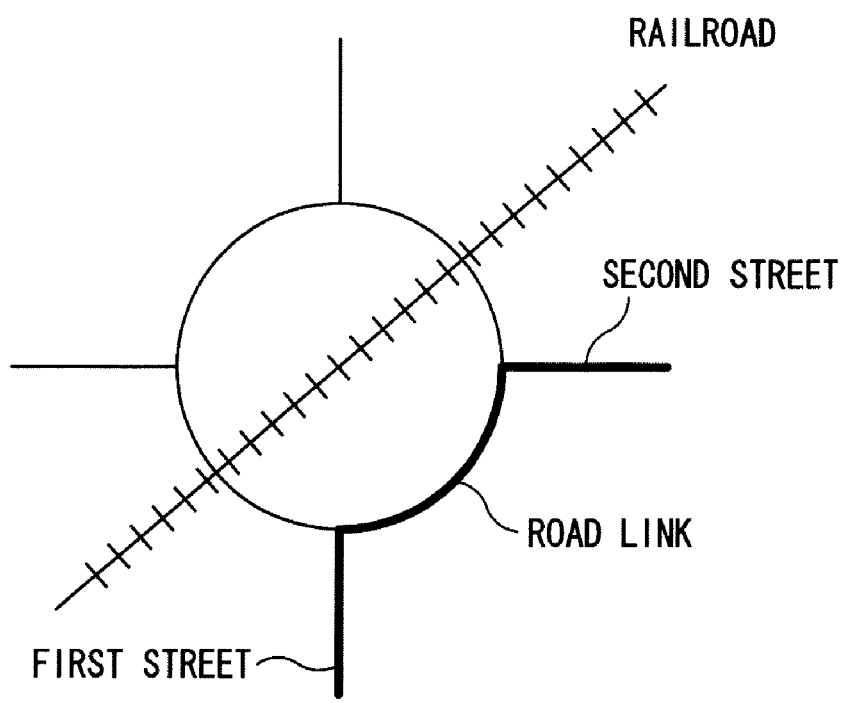
Figure 14:
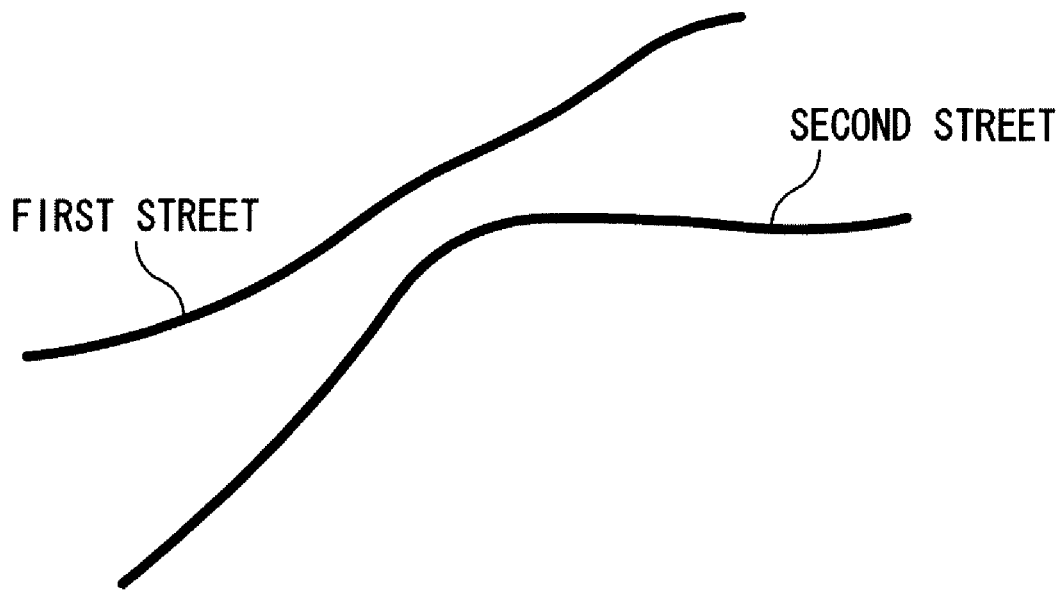
FIG. 14 is a fourth diagram showing a destination or a via-point set as data for a search by a method for producing data for a search on a navigation device for a vehicle.

The branch point or the area may include a crossroad (FIG. 11(a)) and a roundabout (FIG. 12(a)), as well as a T-intersection, a dogleg branch road including two T-intersections adjacent to each other (FIG. 11(b)), and a branch road, which is similar to a roundabout, but the road is not circularly connected (FIG. 12(b)). They correspond to a branch area where a first street and a second street are connected with each other preferably at a distance within a range equal to or less than 25 m. The distance of 25 m is the distance from the end point (node) of the first street to the start point (node) of the second street, namely, the length of road links connecting these two nodes with each other. Further, they also include a roundabout which is not one way, a roundabout into which other links such as a road (third street) or a rail road is connected (FIGS. 13(a) and 13(b)), and a roundabout including a traffic light. Moreover, the area at which the first street and the second street are adjacent to each other corresponds to an area at which two streets which are not connected with each other, but are adjacent to each other at a distance preferably equal to or less than 25 m in a specified area (FIG. 14), for example.

When the data for a search is stored during the route search, or prepared in advance of a search, even if an identification flag or the like indicating a type of a branch point, or an area, such as a crossroad or a roundabout, is not set to nodes constituting the branch point or the area on ordinary map data, or even if two streets are just adjacent to each other, but are not connected with each other, it is possible to easily search for the branch point or the area, or the adjacent area, and to show it as a destination or a via-point.

Reference numeral 19 denotes an image synthesizing unit. The image synthesizing unit 19 may include a function to superimpose a guided route drawn by the guided route drawing unit 16, and the operation screen, the various marks, and the like generated by the operation screen/mark generation unit 14, on the map image drawn by the map drawing unit 13, and to show them on the screen of the display device 7 according to control of the control unit 12. Further, the image synthesizing unit 19 may include a function to show information on the arithmetic operation and the display process carried out by the navigation device 20 on the screen of the display device 7, as described in more detail below. Reference numeral 18 denotes an audio output unit that outputs an audio signal including guide information relating to navigation to the speaker 8 based on the control by the control unit 12.

It should be noted that the DVD-ROM 1a corresponds to "storage means", the dead reckoning sensor 4 corresponds to "vehicle speed detection means", the display device 7 corresponds to "display means", the control unit 12 corresponds to "control means", and the search data storage unit 17 corresponds to "search data storage means" respectively on the navigation device 20 configured as described above.

As described above, the navigation device for a vehicle according to one embodiment of the present invention includes a search data storage unit 17 which stores, or is storing, data for a search relating to a first street produced by a method for producing data for a search, as described in more detail below. It is thus possible to produce and store data for a search relating to the first street in advance of, or during, the route guidance.

Moreover, the data for a search relating to the first street corresponds to a branch point or an area at which the entered first street and the selected second street are connected with each other, or an area at which the entered first street and the selected second street are adjacent to each other, and they include a branch point or an area at which multiple roads are connected with each other, or are adjacent to each ether at a distance within the predetermined range such as a crossroad, a roundabout, or an intersection which does not belong to these categories.

As a result, it is possible to search for, and to show, a crossroad, a roundabout, and an intersection which does not belong to these categories as a destination or a via-point even if nodes and the like constituting them do not include an attribute identifying them, thereby providing even finer route guidance.

Method for Producing Data for a Search on a Navigation Device for a Vehicle

A description will now be given of a method for producing data for a search on a navigation device for a vehicle with respect to FIGS. 2, 3, and 6 to 9.

Figure 2:
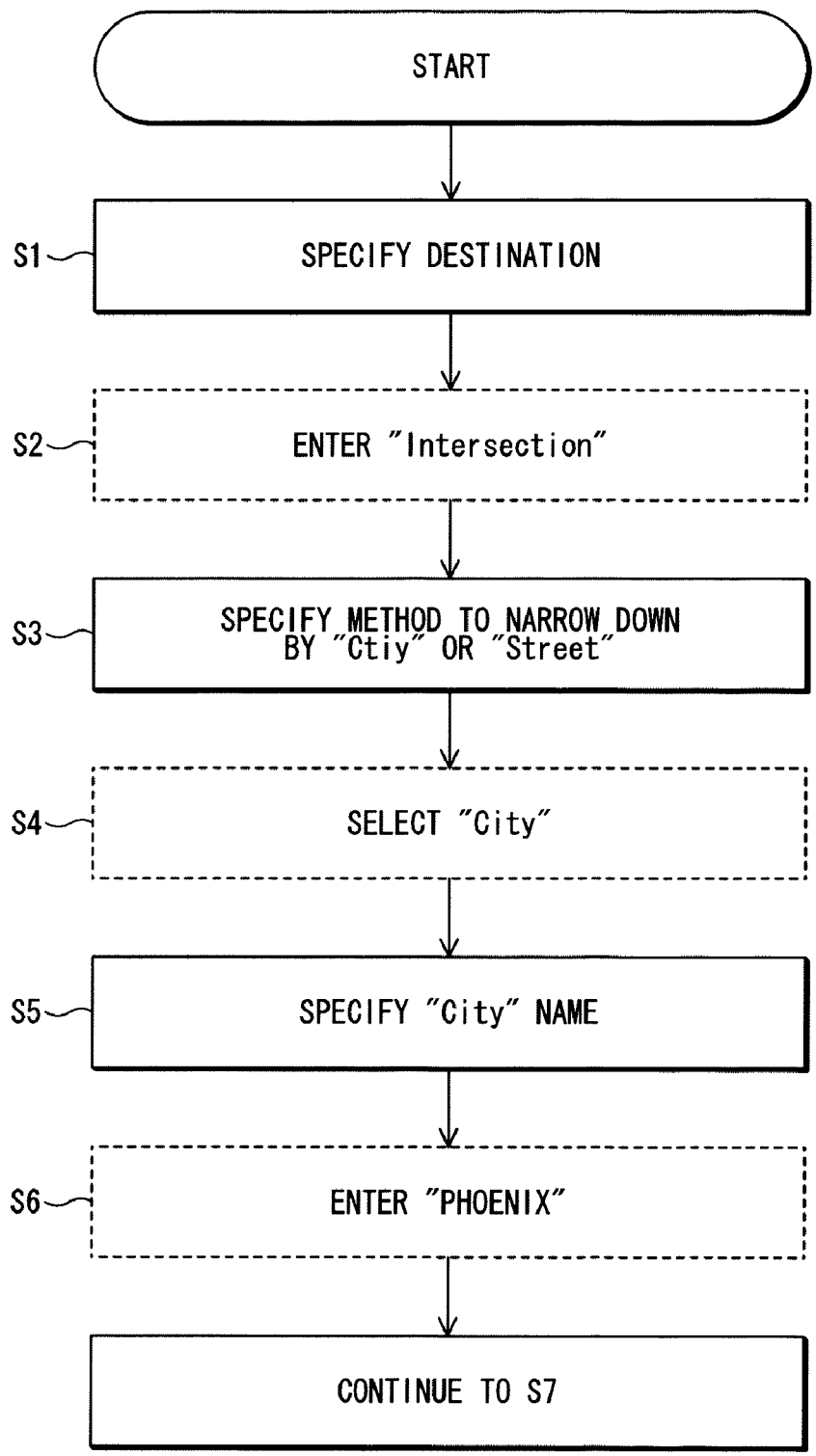
Figure 3:
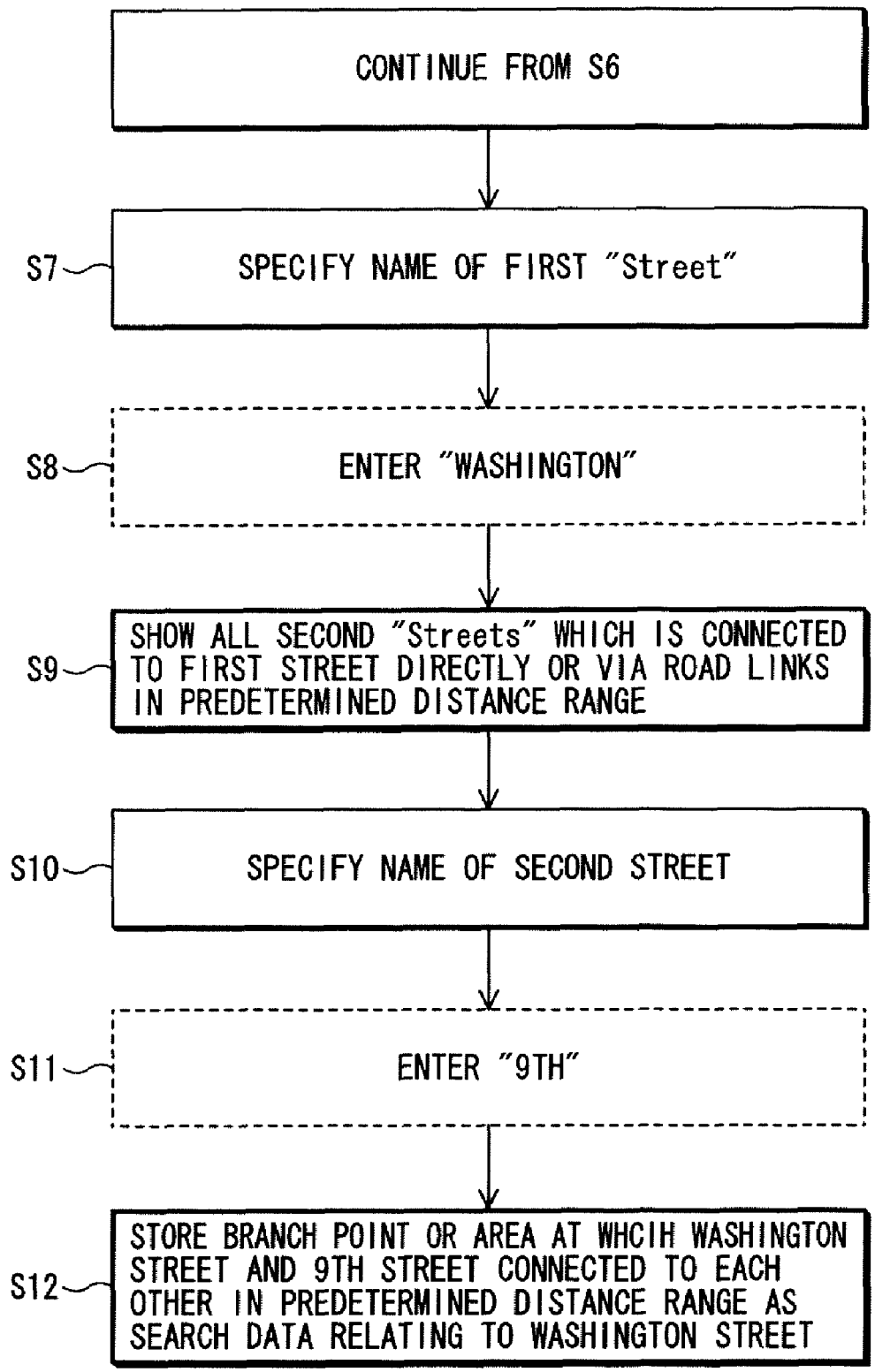

FIGS. 2 and 3 are flowcharts. In FIGS. 2 and 3, operations enclosed by solid lines are inquiries from a navigation device for a vehicle to a driver of the vehicle, operations enclosed by dotted lines are operations carried out by the driver of the vehicle, and operations enclosed by bald lines are operations carried out by the navigation device. A branch point or an area at which a first street and a second street selected by the driver from at least one second street connected directly or via road links at a distance within the range equal to or less than 25 m to the first street are connected with each other corresponds to the data for search on this occasion.

FIGS. 6 to 9 show screens of the display device of the navigation device for the vehicle shown according to one embodiment of the method for producing data for search. In one embodiment of the method for producing data for a search, the control unit 12 prompts the driver to specify a destination as shown in FIG. 2 in a first step S1. It should be noted that options available for selection as a destination include an address, a place, a previous destination, a today's destination, an address book, a branch point or an area (Intersection), a selection from a map (Map Input), and going home (Go Home) as shown in FIG. 6(a) on the navigation device for vehicle.

Figure 6A:
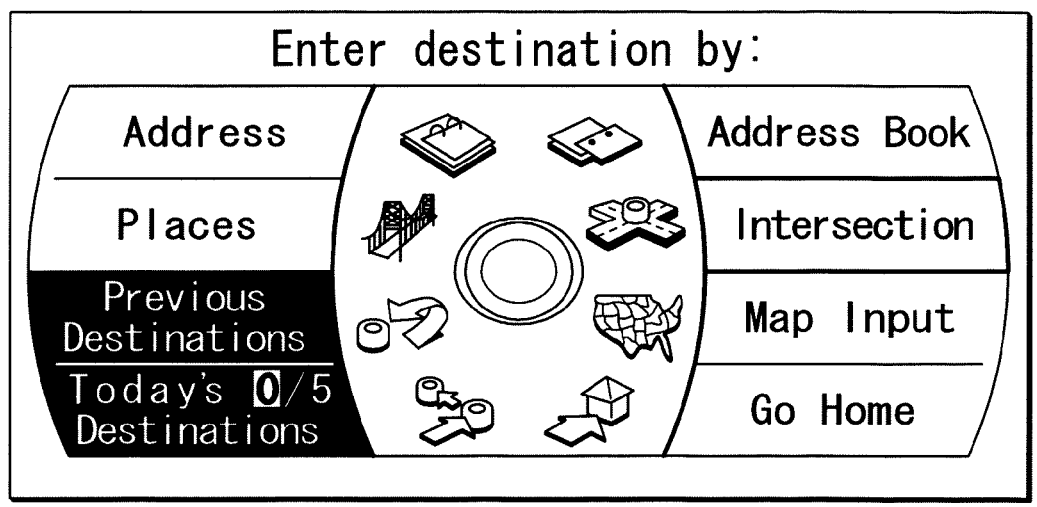
FIGS. 6(a) and 6(b) show first screens of a display device indicating a method for producing data for a search on a navigation device for a vehicle.
Figure 6B:
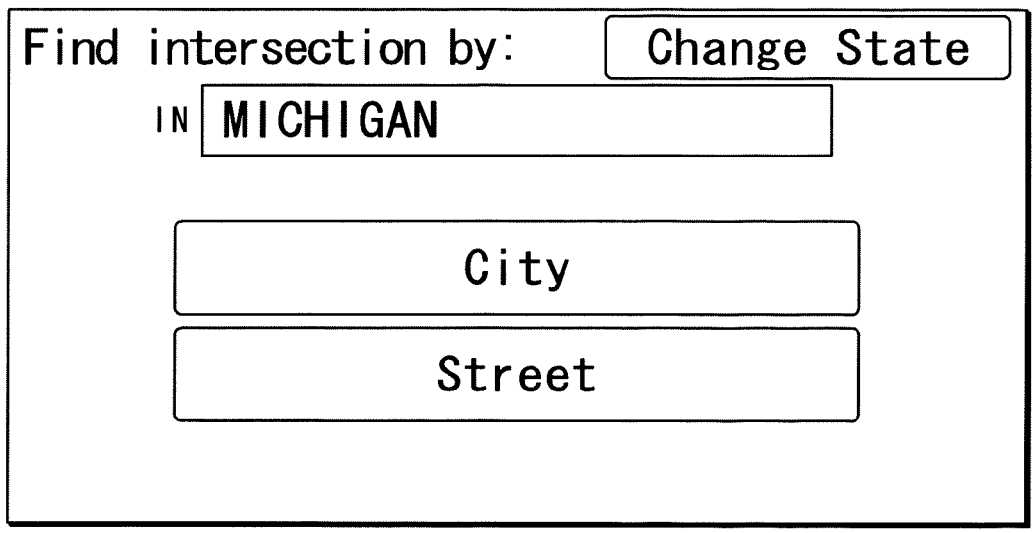

The driver selects an Intersection, as shown FIG. 6(a), to the inquiry from the control unit 12 in a next step S2. The control unit 12 prompts the driver to specify how to narrow down a branch point or an area in the step S3. As the options for the method of narrowing down, either City or Street can be selected as shown in FIG. 6(b).

The driver selects City to the inquiry from the control unit 12 in a next step S4. As a result, the display screen changes to an input screen for City as shown in FIG. 7(a) or a selection screen for City as shown in FIG. 7(b), and the control unit 12 prompts the driver to specify a name of a city (City) in a next step S5.

Figure 7A:
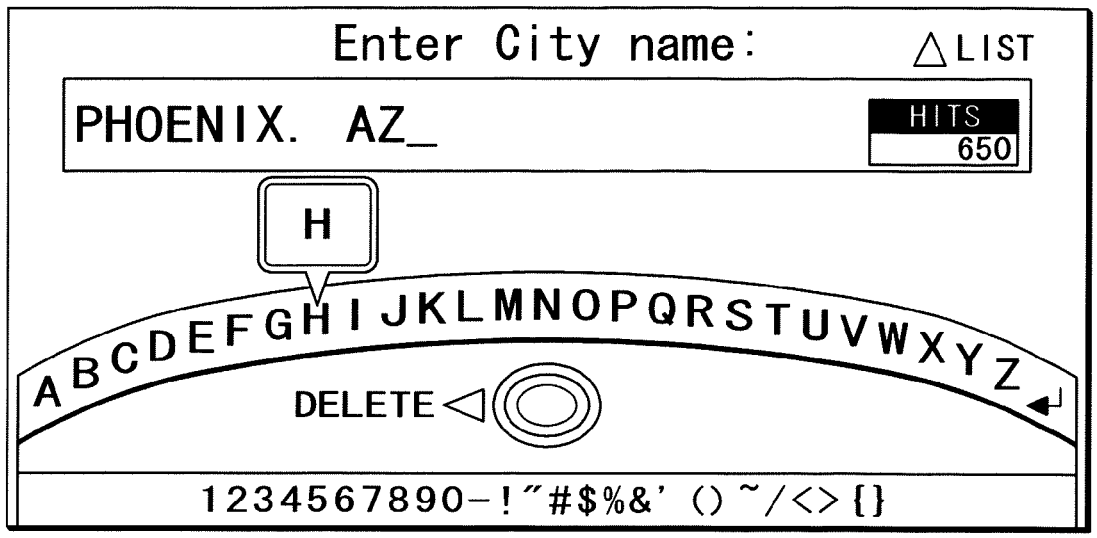
FIGS. 7(a) and 7(b) show second screens of the display device indicating a method for producing data for a search on a navigation device for a vehicle.
Figure 7B:
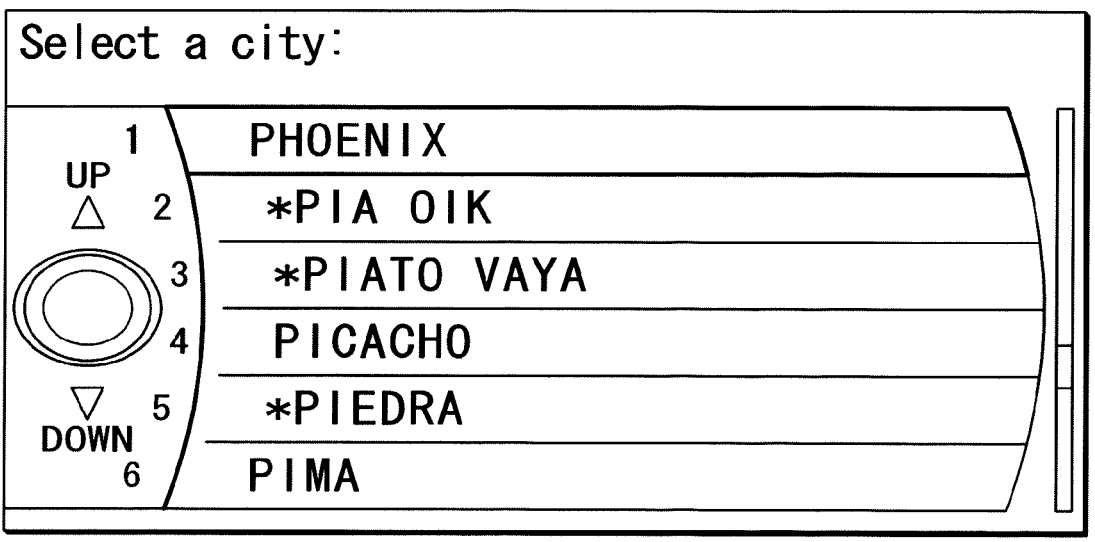

If the display screen is the input screen for a city, the driver enters PHOENIX as a name of a city, as shown in FIG. 7(a), in a next step S6. If the display screen is the selection screen for a city, the driver selects PHOENIX from a list as shown in FIG. 7(b).

Figure 8A:
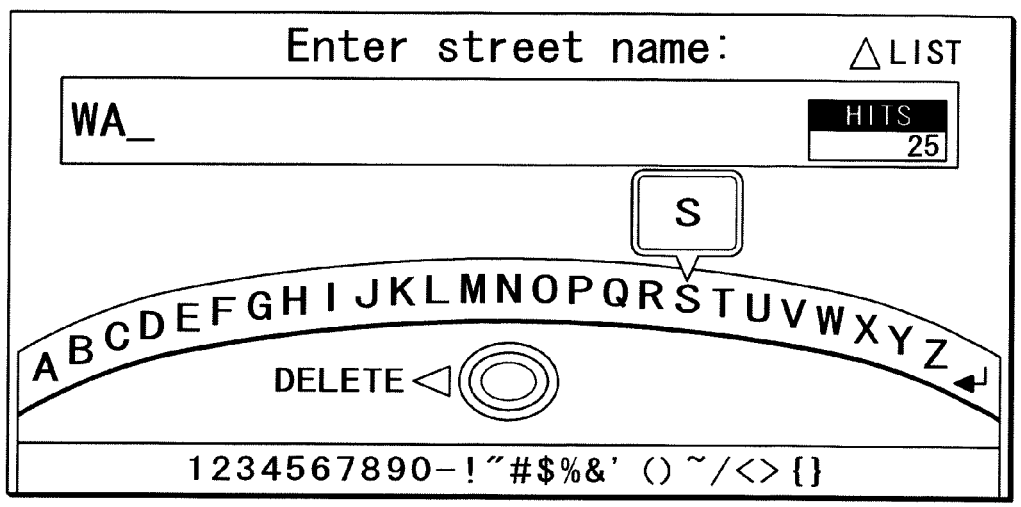
FIGS. 8(a) and 8(b) show third screens of the display device indicating a method for producing data for a search on a navigation device for a vehicle.
Figure 8B:
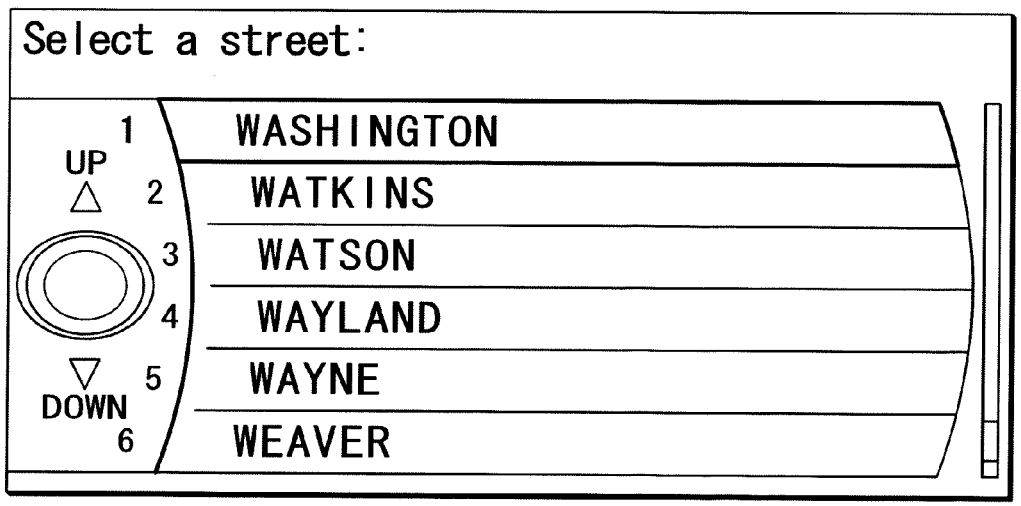

The display screen then changes to an input screen for a first street, as shown in FIG. 8(a), or a selection screen for a first street, as shown in FIG. 8(b), and the control unit 12 prompts the driver to specify a name of a first street in a next step S7. If the display screen is the input screen for a first street, the driver enters WASHINGTON as a name of a first street in a next step S8. If the display screen is the selection screen for a first street, the driver selects WASHINGTON from a list.

The control unit 12 shows all second streets which are connected directly, or via road links, to a node of an end point of the first street at a distance within the range equal to or less than 25 m in the travel direction of the vehicle based on the map data in a next step S9. On this occasion, nodes of a start point of the second streets at connection points are identified in correspondence with the second streets.

Figure 9A:
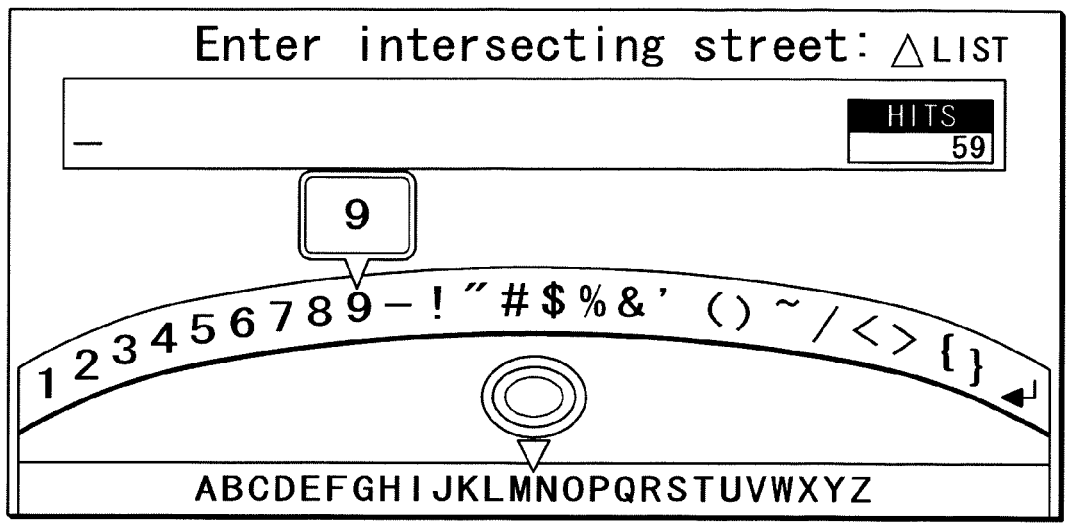
FIGS. 9(a) and 9(b) show fourth screens of the display device indicating a method for producing data for a search on a navigation device for a vehicle.
Figure 9B:
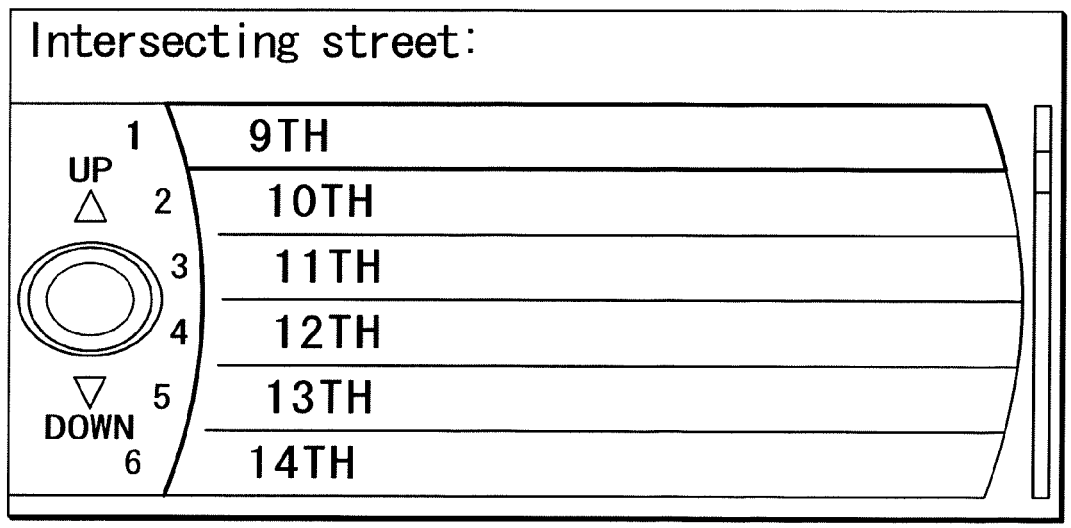

The display screen then changes to an input screen for a second street as shown in FIG. 9(a) or a selection screen for a second street as shown in FIG. 9(b), and the control unit 12 prompts the driver to specify a name of a second street in a next step S10.

If the display screen is the input screen for a second street, the driver enters 9TH (9th street) as a name of a second street in a next step S11. If the display screen is the selection screen for a second street, the driver selects 9TH (9th street) from a list.

The control unit 12 stores data for search for a branch point or an area relating to Washington Street in a next step S12. The data for a search is a first street entered by the driver, a second street selected by the driver, and a branch point or an area at which the first street and the second street are connected with each other directly or via road links associated by the node of the end point of the first street, the road links, the node of the start point of the second street, and the like. The produced data for the search is searched and shown on the display device if the driver enters Washington Street during search for a guided route.

Figure 4:
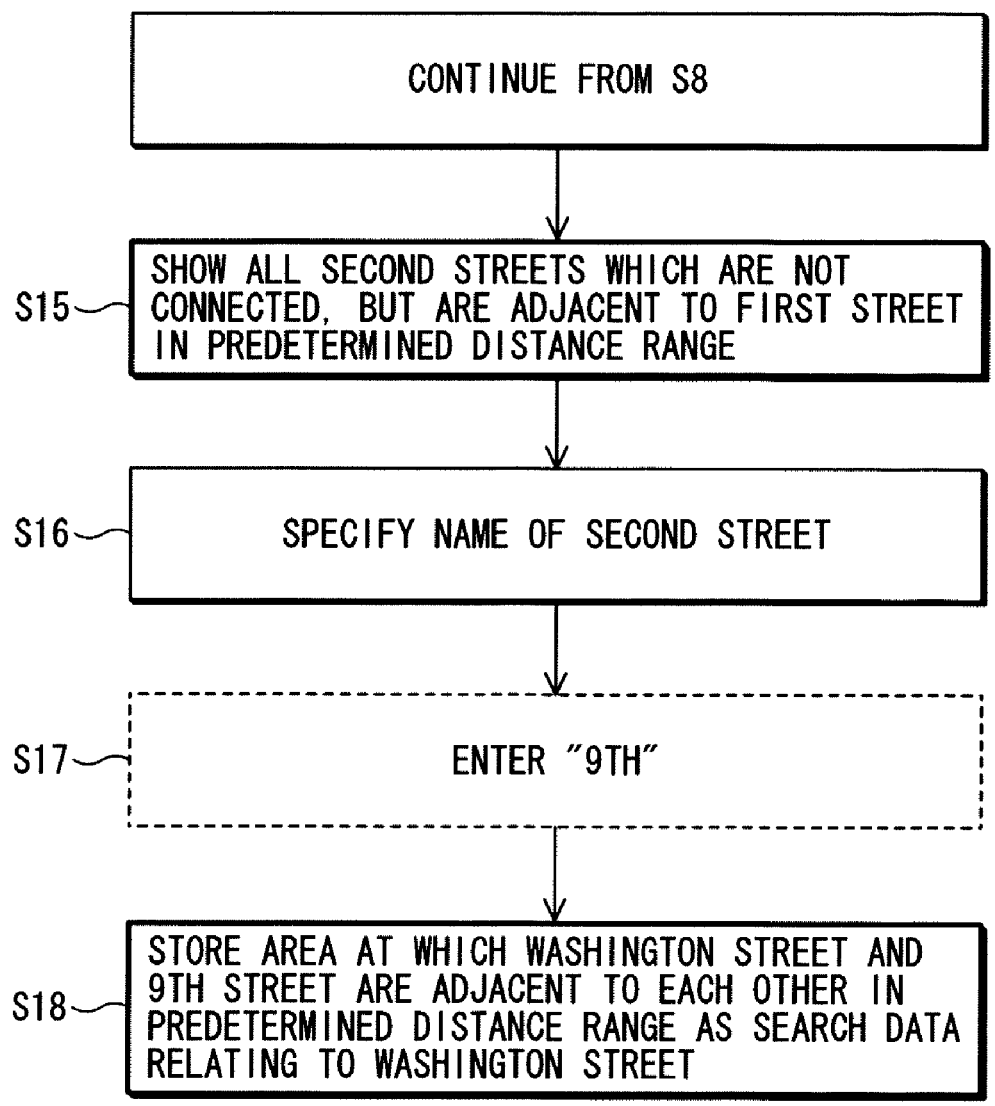

A description will now be given of another embodiment of a method for producing data for a search on a navigation device for a vehicle with respect to FIG. 4. FIG. 4 is a flowchart showing a method for producing data for a search on a navigation device for a vehicle. On this occasion, an area where a first street and a second street, which are not connected with each other, but are adjacent to each other at a distance within the range equal to or less than 25 m corresponds to the data for search.

The second method for producing data for a search is the same as the first method for producing data for a search (described above) up to the step S8, in FIGS. 2 and 3, where the driver enters a name of a first street. Thus, a description up to the step S8 is omitted, and a description will be given of the steps starting from a step S9. FIG. 4 corresponds to steps S15 to S18.

After the driver enters the name of the first street, all second streets, which are not connected, but are adjacent to the first street at a distance in the range equal to or less than 25 m are shown in a step S15. On this occasion, the control unit 12 acquires the area at which the first street and the second street are most adjacent to each other, and the most adjacent distance.

The display screen then changes to an input screen for a second street, or a selection screen for a second street, and the control unit 12 prompts the driver to specify a name of a second street in a next step S16. If the display screen is the input screen for a second street, the driver enters a name of a second street in a next step S17. If the display screen is the selection screen for a second street, the driver selects a name of a second street to be specified from a list.

The control unit 12 stores an adjacent area relating to the first street as data for a search in a next step S18. The data for a search is the first street entered by the driver, the second street selected by the driver, and the area at which the first street and the second street, which are not connected with each other, associated by the area at which the first street and the second street are the most adjacent to each other, and the most adjacent distance. If the first street is entered during the search for a guided route, the produced data for a search is searched for an area at which the first street and the second street are not connected with each other, but are adjacent to each other as a destination or a via point, and is shown on the display device.

As described above, based on the data for a search produced by the method for producing data for a search, it is possible to search for a crossroad or a roundabout, which are conventionally specified by an identification flag of nodes in advance, without specification in advance. Conversely, it is possible to search for a T-intersection, a dogleg branch road including two T-intersections adjacent to each other, or a branch road which is similar to a roundabout, but the road is not circularly connected, and the like, which conventionally are not specified by an identification flag of nodes, and thus cannot be searched for. Moreover, it is possible to search for an area at which a first street and a second street are not connected with each other, but are adjacent to each other.

Method for Searching for a Guided Route on a Navigation Device for a Vehicle

Figure 5:
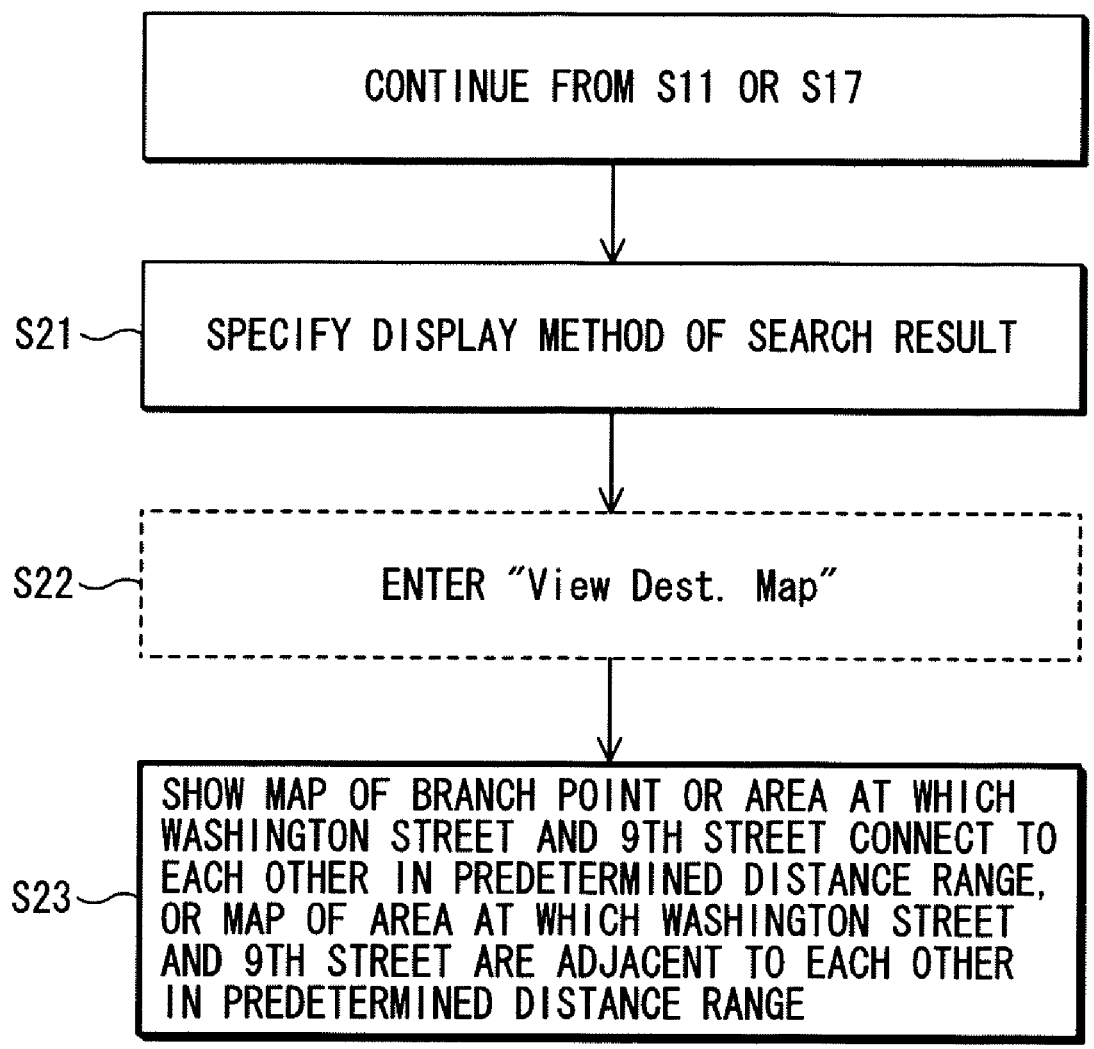
FIG. 5 shows a flowchart of one embodiment of a method for searching for a guided route based on a method for producing data for a search on a navigation device for a vehicle.
Figure 10:
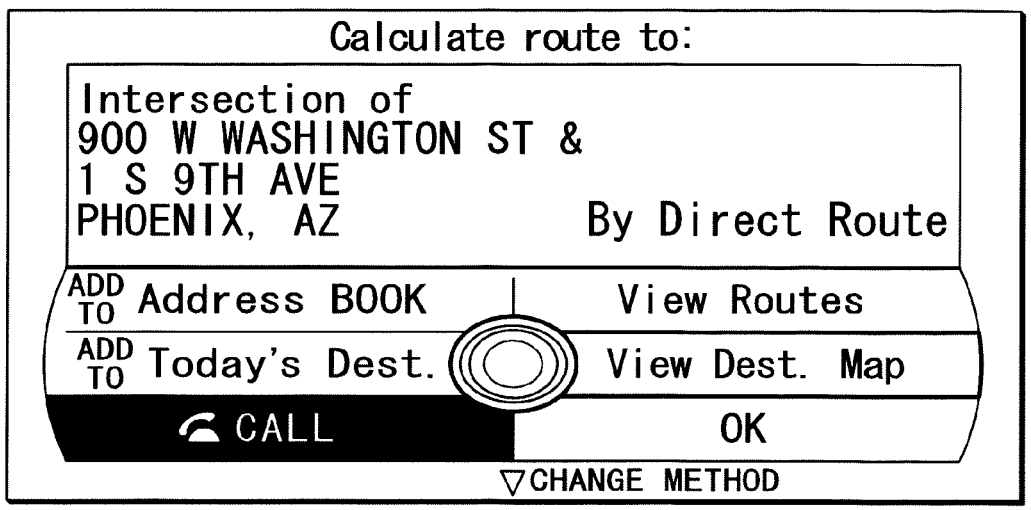
FIGS. 10(a) and 10(b) show screens of the display device of a method for searching for a guided route based on a method for producing data for a search on a navigation device for a vehicle.
Figure 10:
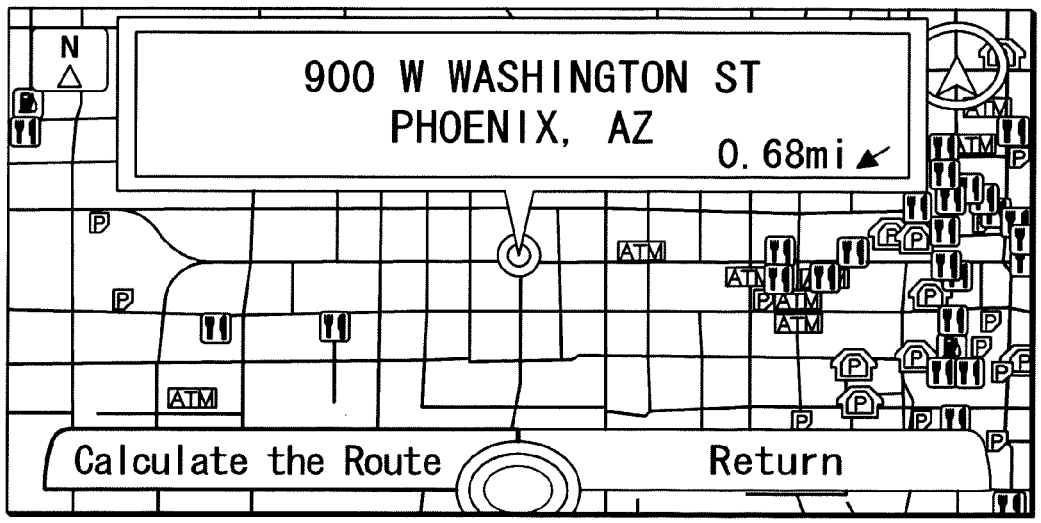

A description will now be given of a method for searching for a guided route on a navigation device for a vehicle with respect to FIGS. 5 and 10. FIG. 5 is a flowchart. In FIG. 5, operations enclosed by solid lines are inquiries from a device to a driver of a vehicle, operations enclosed by dotted lines are operations carried out by the driver of the vehicle, and operations enclosed by bald lines are operations carried out by the device. A branch point or an area at which a first street and a second street, which is selected by a driver from at least one second street connected to the first street at a distance within the range equal to or less than 25 m, are connected with each other directly or via road links, and an area at which a first street and a second street, which is selected by a driver from at least one second street which is not connected, but is adjacent to the first street in a range equal to or less than 25 m, are adjacent to each other correspond to the data for search on this occasion.

FIGS. 10(a) to 10(b) show screens of a display device of a navigation device for a vehicle shown according to a method for searching for a guided route. An embodiment of a method for searching for a guided route is similar to the method for producing data for a search up to the step S11 in FIGS. 2 and 3 in which a driver enters a name of a first street, or up to the step S17 in FIG. 4 in which a driver enters a name of a first street. Moreover, a process up to the step S11 in FIGS. 2 and 3, or a process up to the step S17 in FIG. 4 corresponds to the screens of the display device in FIGS. 6 to 9. Thus, a description of these steps is omitted, and a description will be given of steps following the step S12 or the step S18. These steps correspond to steps S21 to S23 in FIG. 5, and the display screens in FIGS. 10(a) and 10(b).

According to the method for searching for a guided route, after the driver enters "9TH" as a name of a second street (S11 or S17), the control unit 12 of the navigation device for the vehicle prompts the driver to specify a display method of a result of the search in the first step S21. Options available for specifying the display method of the search result may include adding to an address book, adding to a today's destination, calling a destination, viewing routes, viewing a destination map, and leaving as it is (OK).

The driver selects viewing a destination map as shown in FIG. 10(a) in a next step S22. As a result, a branch point or an area at which the first street and the second street are connected with each other directly or mutually via a road link in a range equal to or less than 25 m, or an area at which the first street and the second street are mutually adjacent to each other at a distance within the range equal to or less than 25 m, is shown on the display device as shown in FIG. 10(b) in a next step S23.

As described above, according to the method for searching for a guided route according to the embodiment of the present invention, even if the identification flag indicating a type of a branch point or an area is not set to nodes constituting the branch point or the area in ordinary map data, it is possible by simply entering a name of a first street based on the map data, and selecting one of second streets searched as a result to easily search for, and to show, a branch point or an area at which the first street and the second street are connected with each other at a distance within the predetermined distance range, or an area at which the first street and the second street are not connected with each other, but are adjacent to each other within the predetermined distance range as a destination or a via-point. It is thus possible to provide even finer route guidance.

It will be appreciated that the descriptions of the embodiments above should be regarded as illustrative rather than limiting, and that it is the claims, including all equivalents, that are intended to define the spirit and scope of this invention.

For example, even though independent programs are described as producing data for a search for a destination, or a via-point, and carrying out the search, a single program may produce the data for a search for a destination, or a via-point, and carry out the search.

Moreover, though a branch point or an area, or an adjacent area, is limited to an area at which a first street and a second street are at a distance within the range equal to or less than 25 m, the range is not limited to 25 m, and can be properly changed according to a traveling area and traveling conditions.

Moreover, if a first street and a second street are connected with each other via road links, the number of the road links may be one as shown in FIGS. 11(b) and 12(a) or two or more as shown in FIG. 12(b).

What is claimed is:

1. A method for producing search data used in an onboard vehicle navigation device to perform a route search based on map data, wherein a road is represented as a set of nodes and road links, and a set of specific nodes and road links is defined as a specific street, the method comprising:
   receiving a name of a first street;
   searching for and showing second streets that are connected directly at a node or by a road link to an end point of the first street, a length of the road link being less than or equal to a predetermined distance, wherein the node and the road link are not associated with identifying attribute data;
   selecting one of the shown second streets; and
   storing a branch point or an area at which the first street and the selected second street are connected with each other as data for performing a search relating to the first street,
   wherein when a search is performed for an intersection between the first and second streets, the branch point or area at which the first street and the selected second street are connected with each other is displayed on a display as a destination or a via-point along a guiding route.

2. The method for producing search data used in an onboard vehicle navigation device to perform a route search based on map data according to claim 1, wherein the predetermined distance is 25 meters.

3. The method for producing search data used in an onboard vehicle navigation device to perform a route search based on map data according to claim 1, wherein the data for performing a search related to the first street is produced in advance of or during a route search.

4. The method for producing search data used in an onboard vehicle navigation device to perform a route search based on map data according to claim 1, wherein the branch point or the area at which the first street and the second street are connected with each other directly or by the road link is an intersection or an area at which at least three streets join.

5. The method for producing search data used in an onboard vehicle navigation device to perform a route search based on map data according to claim 4, wherein the intersection at which at least three streets join is a crossroad or a roundabout.

6. A method for producing search data for use in an onboard vehicle navigation device to perform a route search based on map data, wherein a road is represented as a set of nodes and road links, and a set of specific nodes and road links is defined as a specific street, the method comprising:
   receiving a name of a first street;
   searching for and showing at least one second street which is adjacent but not connected to the first street;
   selecting one of the shown second streets; and
   storing an area at which the first street and the selected second street are adjacent but not connected to each other as data for performing a search relating to the first street, wherein, in the area, a distance between the first street and the second street is less than or equal to a predetermined value,
   wherein, when a search is performed for an intersection between the first and second streets, the area at which the first and the selected second streets which are adjacent but not connected to each other by a distance that is less than or equal to the predetermined value is displayed on a display unit as a destination or a via-point along a guiding route.

7. A method of searching for a guided route on a vehicle-onboard navigation device based on map data, wherein a road is represented as a set of nodes and road links, and a set of specific nodes and road links is defined as a specific street, the method comprising:
   receiving a name of a first street;
   searching for and showing second streets that are connected directly or by a node or a road link to an end point of the first street, a length of the road link being less than or equal to a predetermined distance, wherein the node and the road link are not associated with identifying attribute data;
   selecting one of the shown second streets; and
   showing a map of a branch point or an area at which the first street and the selected second street are connected with each other as a destination or a via-point along a guiding route.

8. A method of searching for a guided route on an onboard vehicle navigation device based on map data wherein a road is represented as a set of nodes and road links, and a set of specific nodes and road links is defined as a specific street, the method comprising:
   receiving a name of a first street;
   searching for and showing second streets which are not connected to each other, but are adjacent to the first street, wherein, in the area, a distance between the first street and the second street is less than or equal to a predetermined value;
   selecting one of the shown second streets; and
   showing a map of an area at which the first street and the selected second street are adjacent to each other as a destination or a via-point along a guiding route.

9. An onboard vehicle navigation device for showing and defining a guided route to a destination, the onboard vehicle navigation device comprising:
   storage means for storing map data, the map data including roads, wherein the roads are represented as a set of nodes and road links, and wherein at least one set of specific nodes and road links are defined as a specific street, wherein a length of the road link is less than or equal to a predetermined distance, and wherein the node and the road link are not associated with identifying attribute data;
   input means for receiving a name of a first street;

a search data storage unit that stores data for performing a search relating to the first street;

a display device that shows guide information; and a control unit connected to the, said storage means for the map data, said search data storage means, and said display means, wherein, when the first street is entered, the control unit searches the search data storage unit for a second street which is connected directly or by a road link to an end point of the first street, and shows a branch point or an area at which the first street and the searched second street are connected with each other on the display device as a destination or a via-point along a guiding route on a map.

10. The onboard vehicle navigation device according to claim 9, wherein a length of the road link is 25 meters.

11. The onboard vehicle navigation device according to claim 9, wherein the branch point or the area at which the first street and the second street are connected with each other directly or by the road link is a branch point or an area at which at least three streets join.

12. The onboard vehicle navigation device according to claim 11, wherein the branch point or the area at which at least three streets join is a crossroad or a roundabout.

13. An onboard vehicle navigation device for showing and determining a guided route to a destination, the onboard vehicle navigation device comprising:

storage means for storing map data including roads, wherein the roads are represented as a set of nodes and road links, and wherein a set of specific nodes and road links is defined as a specific street;

input means for receiving a name of a first street;

a search data storage unit that stores data for performing a search relating to the first street;

a display device that shows guide information; and a control unit that is connected to the input means, the storage means for the map data, the search data storage unit, and the display device, wherein, when the first street is entered, the control unit searches the search data storage unit for at least one second street which is adjacent but not connected to the first street and within a predetermined distance of the first street, and shows a map of an area at which the first street and the searched second street are adjacent to each other and within the predetermined distance on the display device, the area being displayed as a destination or a via-point along a guiding route on a map.

14. The onboard vehicle navigation device according to claim 13, wherein the predetermined distance is less than or equal to 25 meters.

15. The method for producing search data used in an onboard vehicle navigation device to perform a route search based on map data of claim 1, wherein the branch point or area comprises a dogleg branch road formed by two adjacent T-junctions or a branch road that is similar to a roundabout but that is not circularly connected.

16. The method for producing search data used in an onboard vehicle navigation device to perform a route search based on map data of claim 6, wherein the area comprises a dogleg branch road formed by two adjacent T-junctions or a branch road that is similar to a roundabout but that is not circularly connected.

17. A method of searching for a guided route on a vehicle-onboard navigation device based on map data according to claim 7, wherein the branch point or area comprises a dogleg branch road formed by two adjacent T-junctions or a branch road that is similar to a roundabout but that is not circularly connected.

18. A method of searching for a guided route on a vehicle-onboard navigation device based on map data according to claim 8, wherein the area comprises a dogleg branch road formed by two adjacent T-junctions or a branch road that is similar to a roundabout but that is not circularly connected.

19. An onboard vehicle navigation device for showing and defining a guided route to a destination according to claim 9, wherein the branch point or area comprises a dogleg branch road formed by two adjacent T-junctions or a branch road that is similar to a roundabout but that is not circularly connected.

20. An onboard vehicle navigation device for showing and defining a guided route to a destination according to claim 13, wherein the area comprises a dogleg branch road formed by two adjacent T-junctions or a branch road that is similar to a roundabout but that is not circularly connected.

* * * * *